June 30, 1942.  H. ST. PIERRE  2,287,913
CHAIN LINK
Filed July 9, 1941  2 Sheets-Sheet 1

Inventor
Henry St. Pierre
By attorney
Charles R. Fay

June 30, 1942.   H. ST. PIERRE   2,287,913
CHAIN LINK
Filed July 9, 1941   2 Sheets-Sheet 2
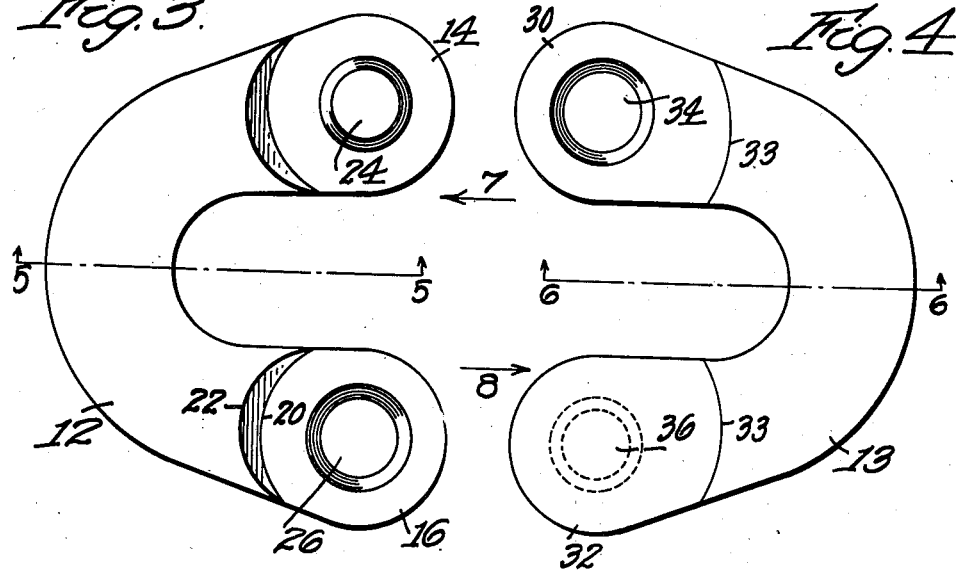
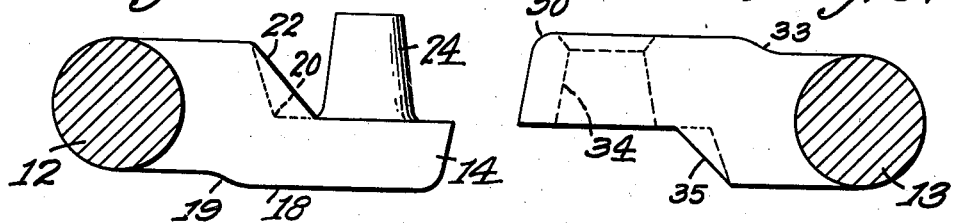
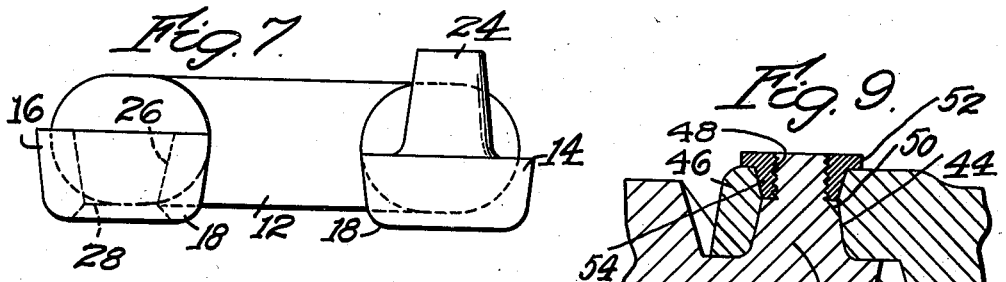
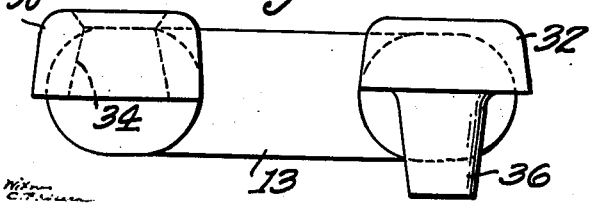
Inventor
Henry St. Pierre
By attorney
Charles R. Fay Patented June 30, 1942

2,287,913

UNITED STATES PATENT OFFICE 2,287,913

CHAIN LINK

Henry St. Pierre, Worcester, Mass.

Application July 9, 1941, Serial No. 401,604

9 Claims. (Cl. 59—87)

This invention relates to chain links and more particularly to forged links made in two complementary parts to enable the assembly of continuous chain made up of forged links.

In the manufacture of large chain for heavy duty use in moist atmospheres such as for harbor defense work, it is desirable to utilize alloys of great strength and resistance to rust, but such alloys are not weldable commercially, so that production of continuous chain of this type has not been satisfactory in the past. Also, forged alloy chain may be heat treated more advantageously than welded steel chain, and in pickling, etc., the acids used attack iron and steel chain and their welds, so that a forged alloy heavy duty chain would be used if it were commercially feasible to make it.

It is accordingly the principal object of this invention to provide chain links capable of being forged of high strength steels and alloys, and in which the chain may be assembled in continuous lengths by the provision of two part links which are easily closed and secured, even by unskilled help, to include a pair of solid links, so as to cheaply, quickly, and easily build up the desired continuous chain. Another object is to provide uniform chain, which is not practicable by welding, as the welds vary; and to provide inexpensively made but strong high tension chain by relatively simple forging operations.

Other objects include the provision of two separate forged blanks of heavy duty link material and having general U shapes with cooperating pins and holes at opposite ends of the arms of the U, for easy assembly either at the factory or in the field; the provision of two part links which are easily forged and may be put together by hot or cold forging depending on the type of metal used and which are strong enough for the heaviest duty; the provision of links as aforesaid which are assembled by detachable fasteners so that links may be inserted or detached from a chain on the job without cutting or otherwise spoiling the links; and the provision of two part forged links having special reinforcements to render the same as strong as solid links of the same size and material.

Other objects and advantages of the invention will appear hereinafter.

Reference is to be had to the accompanying drawings, in which

Fig. 3 is a top plan view of one forged part of the link;

Fig. 4 is a top plan view of the other forged part;

Fig. 5 is a section on line 5—5 of Fig. 3;

Fig. 6 is a section on line 6—6 of Fig. 4;

Fig. 7 is a front view of the link part shown in Fig. 3 and looking in the direction of arrow 7 in that figure;

Fig. 8 is a front view of the link part shown in Fig. 4 and looking in the direction of arrow 8 in that figure; and Fig. 9 is a vertical section thru a modified link fastening device.

Figure 1:
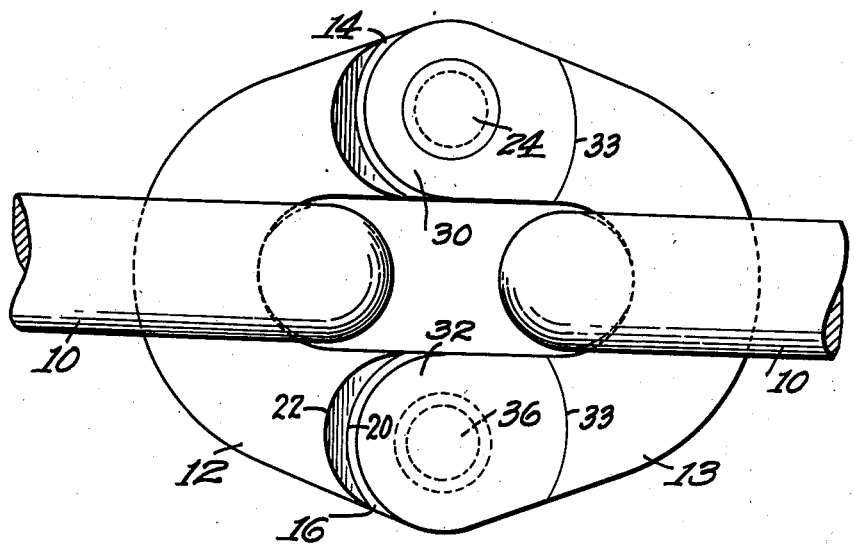
Fig. 1 is a plan view of a link according to the present invention and showing it in assembled relation to a pair of solid links.
Figure 2:
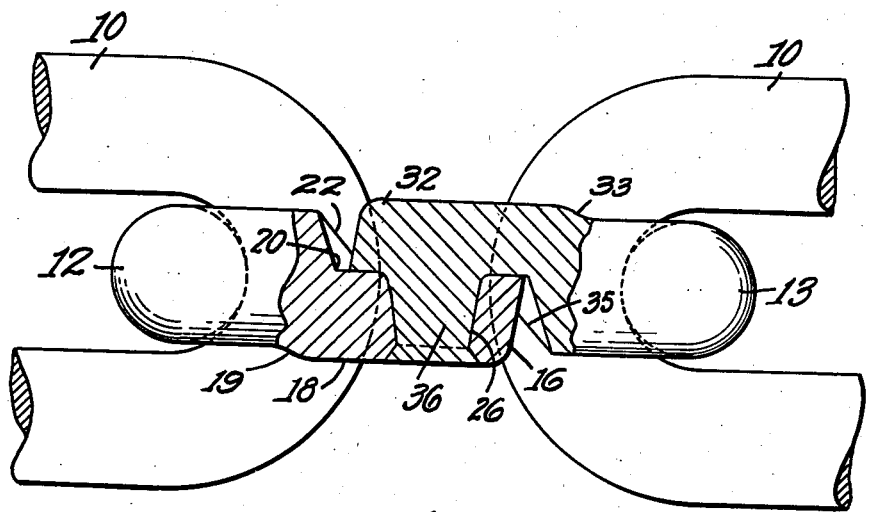
Fig. 2 is an edge view of the new link of Fig. 1, the solid links being in plan.

In the drawings, the numeral 10 indicates a pair of solid links of large diameter which are assembled with the new two part link 12, 13. It will be seen that with the link parts 12, 13 separated as in Figs. 3 and 4, a pair of solid links 10 may be hooked into the parts 12, 13 prior to the connection of the latter to thereby form continuous chain of a heavy type.

Link parts 12 and 13 are generally similar but as described below, the side fasteners are interchanged as to the arms of the parts. Link part 12 is seen to have a U shape with enlarged flattened and reduced circular ends 14, 16 which are offset beyond the lateral aspect of the base of the U as at 18, this offset forming a shoulder 19 merging with the body of the link part. Each end is formed in a die by straight forging blows to be deeply drawn as at 20 on a considerable relief angle, which forms a strengthening shoulder 22, and end 14 is formed with a tapering but thick plug or pin 24 which extends above or beyond the lateral aspect of the base of the U oppositely to offset 18. At the relief angle shoulder 22, the formation is circular and generally concentric with plug 24.

Link end portion 16 is forged with a through opening 26, as best shown in Fig. 7, this opening being circular but tapering from both ends to a line 28 located adjacent one end thereof. These tapers allow excellent draws for the forging tools, as well as providing for an easy reception of a corresponding plug in the long taper and another purpose to be described for the short taper, it being noted that the line 28 is adjacent the offset 18 which is opposite the plug in end 14. It will be seen that end 14 is brought down narrower than end 16; that is, end 16 extends from its offset transversely past the center line of the link and end 14 stops short thereof. This construction has the effect of strengthening the apertured end 16 which in effect takes its extra material from the narrow end 14, the latter being solid and capable of standing this loss. Both ends are forged wider than the diameter of part 12, see Figs. 7 and 8.

Link part 13 is similar to link part 12, but the opening and plug are interchanged. Thus relatively speaking, the ends 30, 32 may be said to be offset to the same side as ends 14, 16, and are of the same shape, forming shoulders 33 and 35, but the opening 34 and plug 36 although exactly similar to opening 26 and plug 24, are located on opposite ends, as will be clear from Fig. 8. Hence either link part can be dropped directly vertically into place on the other and no angular placement or bending or twisting of the parts is necessary to assemble the links. Once the link parts are assembled with the solid links 10 included therein, it is only necessary to peen over the free end of the plugs, which action fills the short taper in the bore 26 or 34 and provides a lock for the parts. It is to be noted that shoulders 19 and 33 provide an excess of metal section from the bottoms of shoulders 22, 35 thru to the opposite side of the link, and shoulders 19, 22 and 33, 35 cooperate to resist bending at this area.

In the modified connection of Fig. 9, a plug 40 in an end 42 and opening 44 in an end 46 are forged approximately the same as above described, but in this case the plug is reduced and threaded at 48 and the opening is formed with its least diameter substantially midway its ends as at 50. When the parts are put together, a hex nut having a thin head 52 and a threaded body 54 is used to secure the parts in a detachable manner so as to provide for replacing or adding links to the chain without cutting. The body 54 is exteriorly tapered to fit the relieved opening 44 oppositely to the engagement of the plug and the opening adjacent the plug base, this construction providing an extremely strong connection not heretofore possible in links of the present type.

It will be clear from the above that the link connections of the present invention are strengthened in the locations of most stress, as by the offsets 18, shoulders 22, 23 and thickening of all the apertured ends, so that the tendency for the plugs 24, 36, or 48 to twist or bend under tension is largely overcome and the breaking point of any link will be located at the solid ends or corners of the links as in solid links.

Having thus described my invention and the advantages thereof, I do not wish to be limited to the details herein disclosed, otherwise than as set forth in the claims, but what I claim is.

1. A chain link comprising two U-shaped parts adapted to be connected together, the ends of the legs of said parts being flattened and offset from the general plane of the link, said offsets providing strengthening shoulders at the junction of said offset ends with the body of the parts, certain of said ends having bores therethru and certain other ends having pins extending therefrom oppositely to said offsets, said bores and pins adapted to cooperate to form connections between said parts, said shoulders being thicker than said offsets.

2. A chain link comprising a pair of U-shaped parts having flattened offset portions at the ends of the legs thereof, a pin rising from certain offset portions oppositely to the offset, and bores thru certain other offset portions, the latter being thicker than the former in a direction normal to the general plane of the link.

3. A chain link having a side with an intermediate detachable connection, said connection comprising a transverse pin, a bore receiving said pin, and a nut threaded on said pin and having a portion fitting and extending into said bore.

4. A chain link having a detachable connection in at least one side thereof, said connection comprising a tapered pin, a bore having a taper receiving said pin and a second taper in said bore reverse to said first named taper, a nut adapted to be threaded on said bore, and a tapered body on said nut to be received in said reverse bore.

5. A chain link comprising a pair of generally U-shaped link parts having detachable connections at corresponding ends of the legs thereof, each connection comprising a threaded tapered pin and a bore having a generally hourglass shape, said pin entering said bore from one end thereof and extending therethru, and a nut having an exteriorly tapered body and an interiorly threaded surface for entry in said bore from the other end thereof and adapted to be threaded onto said pin.

6. A two part link having at least one part of general U shape, the ends of the U having flat sides, a bore thru one end and a pin rising from the other end normal to said flat sides, and the bore end being thicker than the pin end in a direction transverse to the plane of the link.

7. A two part link having at least one part of general U shape, the ends of the part having flat sides one of which is offset from the plane of the link, the other side being located between the lateral sides of the link, and a curved shoulder bounding said one side and being formed by the material of the part.

8. A chain link comprising a pair of generally U-shaped parts having their ends adapted to be connected, pins rising from certain of said ends and bores through certain other ends, said pins being received in said bores to complete the link, and the ends having the bores being thicker than the ends having the pins in a direction normal to the general plane of the link.

9. A chain link comprising a pair of generally U-shaped parts having their ends flattened outwardly of the link and offset with respect to the plane of the link, means connecting said ends, and curved shoulders joining said ends and the bodies of said parts, said shoulders extending outwardly of said link away from said bodies to the outwardly located flat areas of said ends.

HENRY ST. PIERRE.